United States Patent [19]
Luebke et al.

[11] Patent Number: 5,999,389
[45] Date of Patent: Dec. 7, 1999

[54] REPEATER FOR BUS WITH BUS FAULT ISOLATION

[75] Inventors: Charles J. Luebke, Sussex; Walter L. Rutchik, New Berlin, both of Wis.

[73] Assignee: Eaton Corporation, Cleveland, Ohio

[21] Appl. No.: 08/736,120

[22] Filed: Oct. 24, 1996

[51] Int. Cl.⁶ ........................................................ H02H 3/00

[52] U.S. Cl. ................................................. 361/68; 361/67

[58] Field of Search .................................. 361/78–79, 81, 361/83, 62–68; 375/211, 214; 379/338–345, 348

[56] References Cited

U.S. PATENT DOCUMENTS 3,659,055  4/1972  Witmore .................................. 375/214

*Primary Examiner*—Michael J. Sherry
*Attorney, Agent, or Firm*—Charles E. Kosinski

[57] ABSTRACT

A repeater for a communication network having an isolation circuit for disabling the transmission of a fault-indicative signal through the repeater onto the network. A retriggerable one-shot starts timing with high to low signal transition. In the absence of a second transition within a defined time period, the one-shot triggers a flip-flop which, depending on the logic level of the input signal, generates an enabling signal passed to a logic gate to selectively allow and cut off the transmission of the signal to the repeater circuit input.

31 Claims, 4 Drawing Sheets

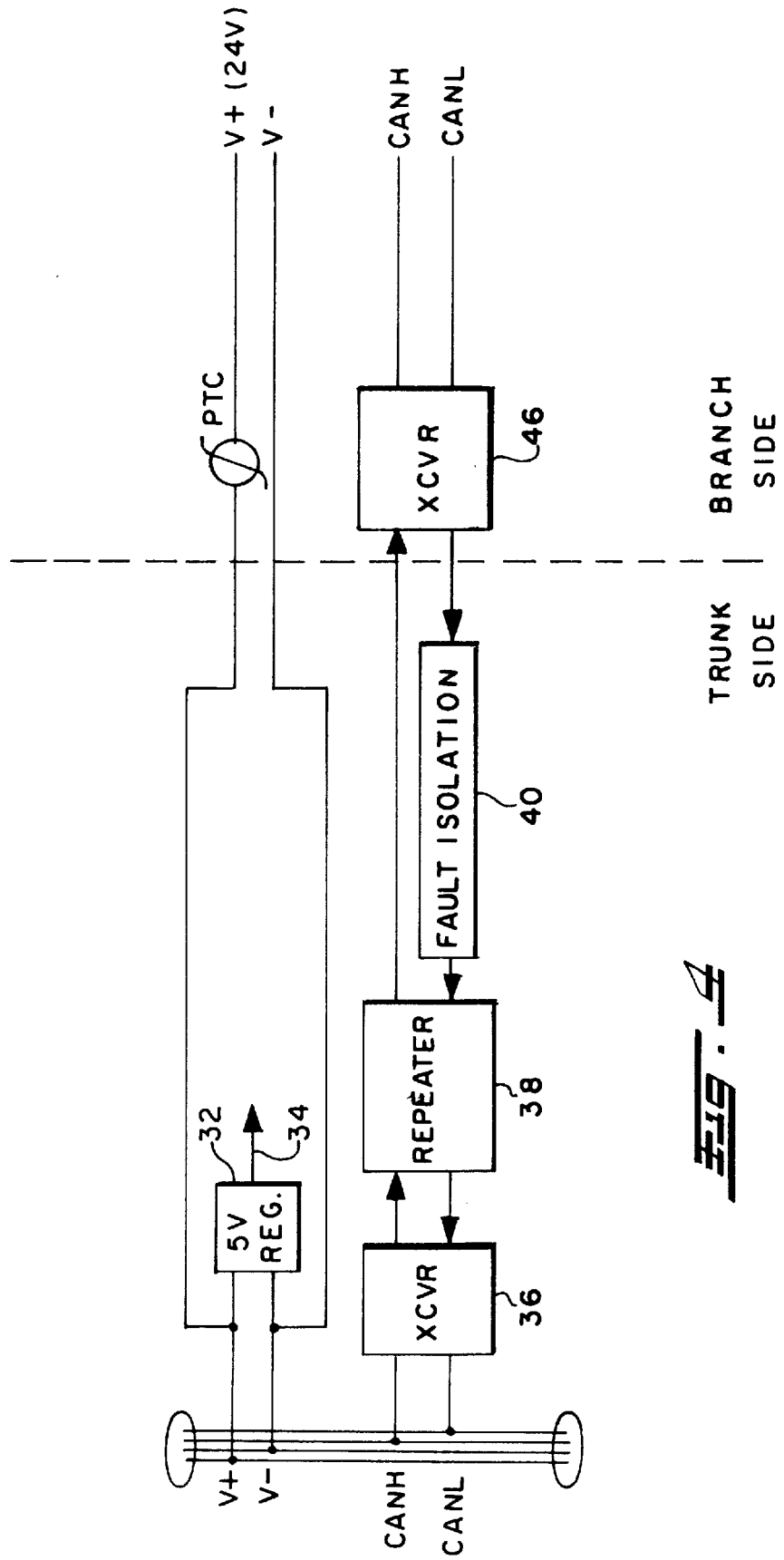
_Fig. 4_

5,999,389

REPEATER FOR BUS WITH BUS FAULT ISOLATION

BACKGROUND AND SUMMARY OF THE INVENTION

This invention relates generally to computer communication networks and, more particularly, to a repeater circuit for a CAN-based network which provides the ability to identify network branch faults as well as to electrically isolate faulty branches from the remainder of the network.

Computer communication networks generally provide interconnection among a number of independent computing stations or devices within a defined area such as a building or plant. At higher data rates, these networks typically employ a topology wherein a long linear bus has a number of relatively short branches connected thereto in order to reduce the signal reflections which would occur due to the impedance mismatch of a long branch. Each branch has one or more computers or devices connected thereto, and a signal transmitted from any station on any branch in the network propagates the length of the bus and can be received by any one or all of the other stations. Signals transmitted in this type of network are generally in the form of "packets" of logically high or low bits which include information such as the address of the transmitting and destination stations used in a manner well known to those in the art to achieve message transfer.

In network applications where interconnected devices are physically distant, such as in an industrial control environment where connected devices may be spread over a large manufacturing plant floor, it takes a significant amount of additional cable to route the linear bus to each device to achieve short branch lengths. However, if relatively long branch lines were used instead to connect all of the devices in order to reduce the amount of cable required, significant degradation of the transmitted signals would occur due to signal reflection. One way of reducing the restricting effects caused by signal degradation and reflection on network topology, while maintaining sufficient signal integrity, is through the use of repeaters. These devices amplify and reconfigure a transmitted signal as it passes therethrough. However, this also means that faults and various signal distortions are amplified as well, thereby corrupting signal transmission on other parts of the network.

The circuit of the present invention provides an improved repeater circuit for a network operated in conformance with a Controller Area Network (CAN) protocol. CAN is a serial communication protocol which supports distributed real time control and multiplexing using a differentially driven 2-wire bus line with a common return as a physical medium. In addition to providing traditional repeater functionality, the present repeater circuit includes isolation circuitry for controllably disabling the repeater, and thereby preventing the further transmission of a fault-indicative signal on the network, such as may be caused by a signal transmission line being shorted to power or ground. Based on the required structure of messages to be transmitted on a CAN-based network, an error or fault in the signal is assumed whenever the signal is dominant (low) for more than 13 bit times.

The present isolation circuit selectively disables the passing of such a fault-indicating signal to the receive input of the repeater circuit. A retriggerable one-shot starts timing with each signal transition from a high to a low logic level. If a second such high to low transition does not occur within a time period equivalent to 13 bit times, the one-shot sends a pulse to a resettable flip-flop which is tripped only if the input signal is low. In response to being tripped, the flip-flop produces an output signal which disables the transmission of the signal to the repeater through a logic gate.

Therefore, while the repeater circuit itself provides the benefits of a traditional repeater as discussed above, the fault isolation circuitry additionally provides the ability to identify a signal fault and isolate a segment transmitting a faulty signal from the remainder of the network. This allows the network to function independently of the faulty segment. In addition, the first transition passes through the isolation circuitry without the additional delay induced by the one-shot circuit thereby providing for fault isolation with a minimal effect on signal propagation time. The repeater and associated fault isolation circuitry is small enough to fit inside the confines of a "tee" shaped or in-line connector, used to physically as well as electrically join two segments of cable.

These and other features and advantages of the present invention will become apparent upon review of the following description, taken in conjunction with the accompanying drawings.

BRIEF DESCRIPTION OF THE DRAWINGS

FIG. 4 is an illustration similar to FIG. 3 showing an alternate preferred network connector implementation.

DETAILED DESCRIPTION OF THE PREFERRED EMBODIMENT

Figure 1:
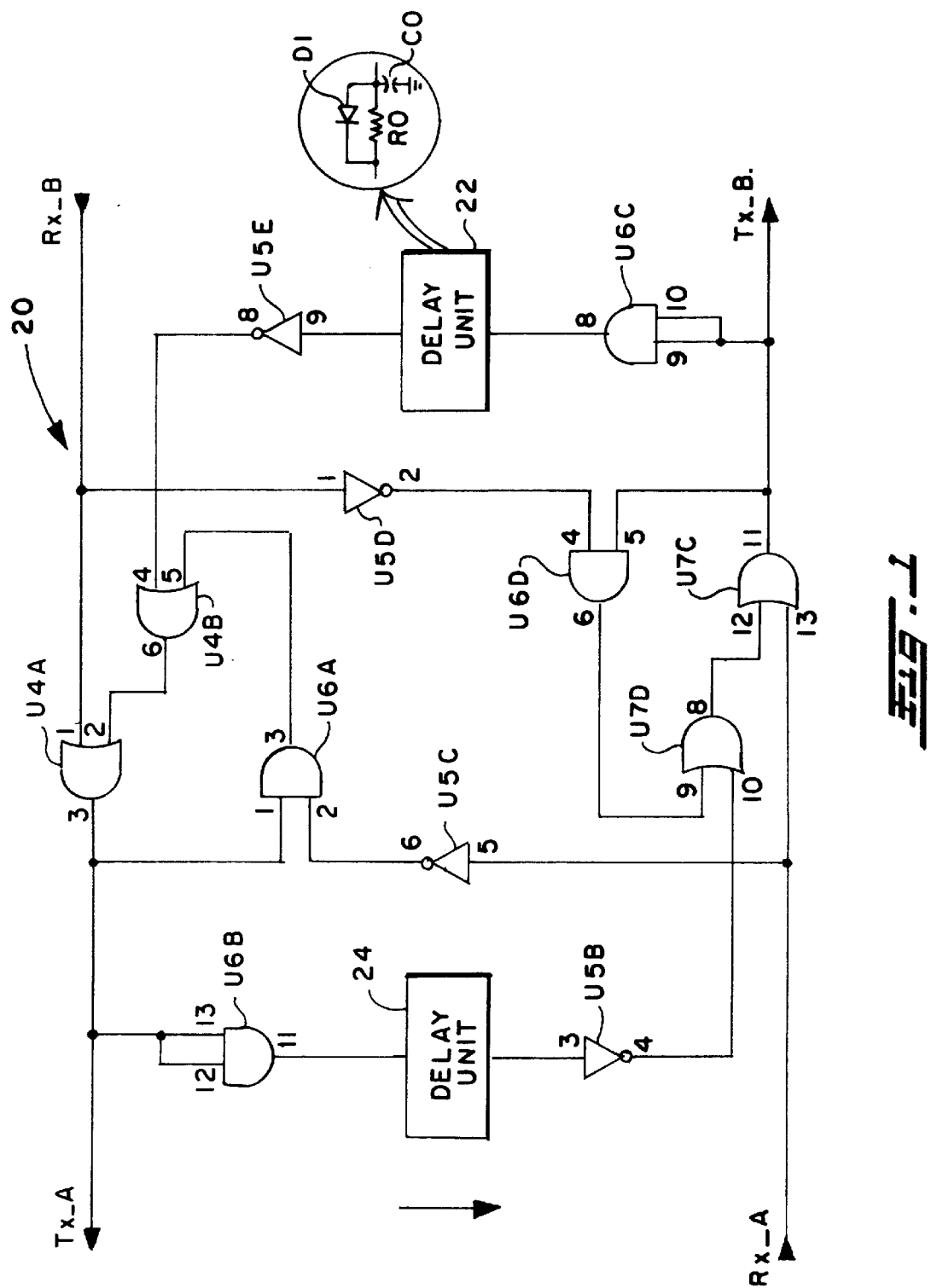
FIG. 1 is an electrical schematic of the interlocking CAN bus repeater.

Turning now to the drawings, and in particular to FIG. 1, an interlocking repeater circuit for a CAN-based network is indicated generally at 20. Since a CAN-based network employs a bus having a pair of data transmission lines which provide a bi-directional data communication capability, the repeater circuit also provides an interlock function which prevents a lockup condition which is caused by loopback (i.e. the receiving of one's own signal back from the other side of the repeater).

Interlocking repeater 10 includes line segments TXA and TXB for transmitting repeated signals onto CAN network transmission lines A and B, respectively. Signals received at RXA are passed through an inverter U5C to input terminal 2 of AND gate U6A and through OR gate U7C to input terminal 5 of AND gate U6D. It is also input into both terminals 9 and 10 of AND gate U6C, having its output terminal 8 connected to a delay unit 22. Delay 22 includes a resistor RO connected in parallel with a diode D1, where both are tied to ground through a capacitor CO. The delayed signal coming out of unit 22 is inverted at inverter U5E and sent to input terminal 4 of OR gate U4B.

Incoming signals received at RXB are similarly passed through mirrored circuitry. Inputs at RXB are passed through OR gate U4A to input terminal 1 of AND gate U6A where a logical AND operation is performed with the inverted RXA signal. If both signals are logically high, a high output on terminal 3 of AND gate U6A is passed through OR gates U4B and U4A, for subsequent retransmission on TXA. The same received signal is also delayed through AND gate U6B and delay unit 24, configured as unit 22, and inverted at U5B. The inverted signal is sent through OR gates U7D and U7C for retransmission on TXB.

Thus, interlocking repeater circuit 20 provides the following functions:

TXA=RXB+$\overline{\text{TXB}}$+TXA·$\overline{\text{RXA}}$ $\overline{\text{TXA}}$=$\overline{\text{RXB}}$·TXB($\overline{\text{TXA}}$+RXA)

TXB=RXA+$\overline{\text{TXA}}$+TXB·$\overline{\text{RXB}}$ $\overline{\text{TXB}}$=RXA·TXA($\overline{\text{TXB}}$+RXB)

Therefore, transmission on TXA is enabled anytime signals are being received on RXB or anytime TXB is not transmitting or when TXA is transmitting (a delayed signal) while a signal is not coming in on RXA. The inverse is true for transmission on TXB.

Figure 2:
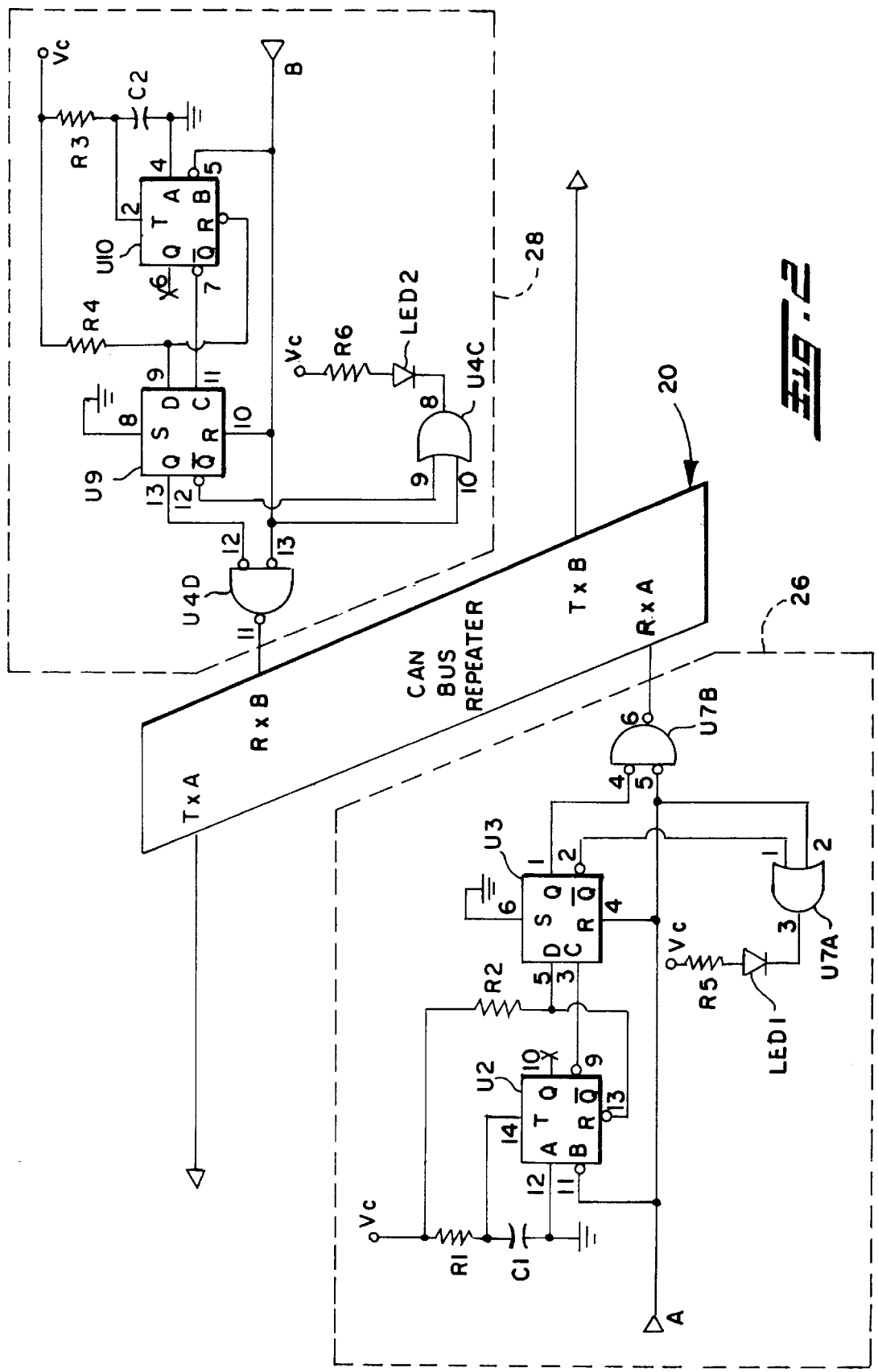
FIG. 2 is a schematic illustrating the interlocking repeater shown in FIG. 1 with fault identification and isolation circuitry.

Turning now to FIG. 2, repeater 20 is shown in conjunction with the fault detection and isolation circuit components of the present invention, 26 and 28. Since isolation circuits 26 and 28 are mirror images of one another with respect to CAN repeater 20, only circuit 26 will be described in detail herein. In addition, it may be desirable to include only one fault isolation circuit in a particular network implementation, in this case either of circuits 26 or 28, as discussed in more detail below.

Isolation circuit 26 includes a retriggerable one-shot U2 having an input terminal T coupled with a capacitor C1 and resistor R1 to a supply voltage Vc, preferably obtained from the power supply of the CAN repeater logic. Vc is also coupled to the reset input R of one-shot U2 through resistor R2 which is a bias resistor for limiting the current from a fixed high input applied to one-shot U2 as well as to a connected resettable flip-flop U3.

An input signal received on transmission line A is transmitted to input B of one-shot U2 as well as the reset input R of flip-flop U3. Input C of U3 is coupled to inverted output $\overline{Q}$ of one-shot U2. Output Q of U3 is connected to a negative AND gate U7B, as is input line A. U3 output $\overline{Q}$ is logically ORed with the signal received on input line A by gate U7A, the output of which is connected through a light emitting diode LED1 connected in series with a resistor R5 to voltage supply Vc.

A signal coming in to isolation circuit 26 on line A is received at the inverted trigger input B of one-shot U2. A dominant signal, going low according to CAN protocol, will trigger the one-shot to start a timing function. In the absence of a time out on one-shot U2, output $\overline{Q}$ of one-shot U2 will be low at terminal 9 and will be received as an input at terminal 3 of flip flop U3. In this instance, output Q of U3 won't change since it triggers or goes high on a rise. Therefore, negative AND gate U7B is enabled and signals received on line A are passed from terminal 6 of gate U7B to receive input terminal RXA of CAN bus repeater 20. Signals received on line A are passed directly through gate U7B and therefore no propagation delay is added due to one-shot U2.

If, however, the one-shot U2, which started timing upon the application of a high to low signal transition at terminal 11, has been low for a predetermined period of time, in the present exemplary embodiment being 13 bit times as mandated by CAN, one-shot U2 will time out. This will cause a high output on $\overline{Q}$ terminal 9, which in turn will trigger flip-flop U3, thereby disabling negative AND gate U7 via a logical high signal on output Q. The high output of gate U7B will prevent further transmission of this faulty signal to repeater 20 for subsequent transmission by the network, thereby shutting down the A side while allowing the B side to function normally.

When such an isolation condition occurs, it is generally desirable to make this condition known to a network controller and, more importantly, to a network operator so that the problem causing the fault can be corrected. In order to provide a visual indication of the identified fault condition and resultant isolation, an optional light emitting diode (LED) circuit can be employed. When both output $\overline{Q}$ of flip-flop U3 and line A are low, OR gate U7A allows light emitting diode LED1 to light. Alternately, any other visual, audible or other suitable means could be used to provide fault indication, including causing a fault indicating message to be generated on a display screen of a controller on the network.

The retriggerable one-shot restarts timing every time the signal received at input B goes low. If the signal applied to one-shot U2 is subsequently high for a period of time, it will still time out. However, the same high signal is also applied to the reset terminal R of flip flop U3, thereby holding the flip flop in a reset position so that the toggle does not affect flip flop U3 and does not change the output of negative AND gate U7B. In addition, even after a signal low for more than 13 bit times causes isolation, a subsequent high signal will reset terminal R of flip-flop U3 and thereby allow transmission of the signal through gate U7B until if and when another 13 bit time low occurs.

This fault isolation circuit 26 can also be applied to input RXB of interlocking repeater 20, shown in FIG. 2 as isolation circuit 28. However, in preferred embodiments of the present invention, as illustrated below in FIGS. 3 and 4, the fault isolation function is only employed in network branches so as to isolate a faulty branch from the remainder of the network. This prohibits a device connected onto the network from transmitting corrupted signals onto the main truck line. If the fault is in the trunk side, the entire network oftentimes is shut down anyway. In addition, this configuration keeps the propagation delay inherent in the repeater from affecting transmission on the main trunk line. However, depending upon the particular network configuration, one of skill in the art can readily envision a wide variety of implementations of the circuitry of the present invention.

The circuitry shown in FIG. 2, including interlocking repeater circuit 20 and either or both of isolating circuits 26 and 28, is compact enough so as to be housed in a network connector, generally used to connect segments of cable to one another, both physically and electrically. These connectors can be either of in-line or "tee" shaped configurations. In one presently preferred network implementation, the repeater circuitry is housed in a tee connector, employed to join a branch line orthogonally onto the main trunk. Within this tee connection, the present circuitry is configured so as to include an isolation circuit, 26 or 28, electrically coupled so as to block faulty signals coming from the branch end from being repeated by repeater circuit 20 and transmitted onto and over the main network truck line to which the branch line is connected. Preferably LED1 is disposed on an outside housing of the connector so as to provide visual indication of the fault at the isolating connection.

Figure 3:
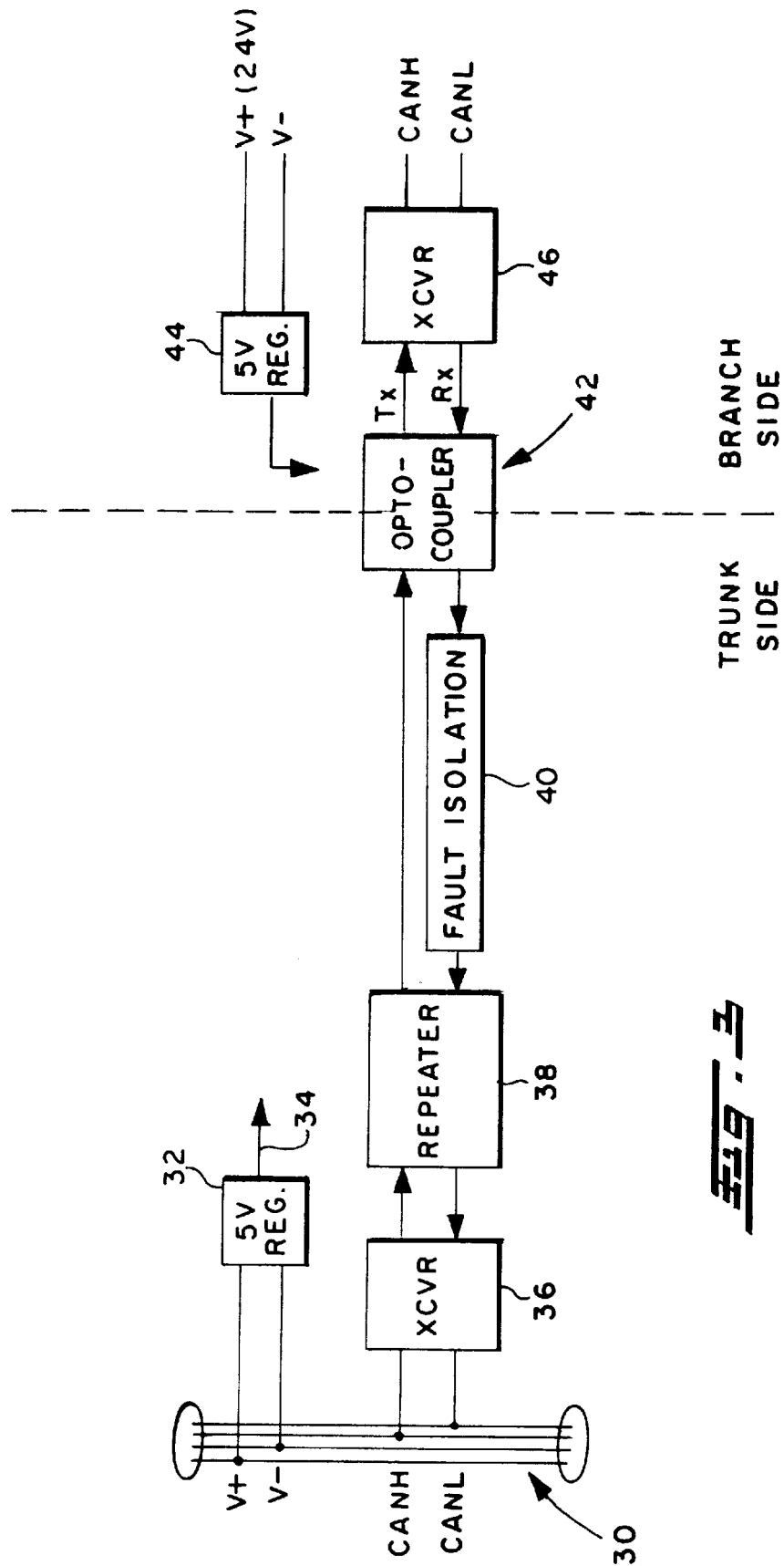
FIG. 3 is a schematic illustrating the components shown in FIGS. 1 and 2 in a preferred network connector implementation.

Turning now to FIG. 3, an implementation of this type of connector, particularly useful wherein a branch has its own external power supply rather than deriving power solely from the network trunk line, is shown schematically therein. The network trunk line 30, generally includes four insulated cables, a supply of power V+, a ground connection V− and CAN high and low signal sources, CANH and CANL respectively. The V+ and V− lines are connected to a 5 volt regulator 32 to provide a regulated output voltage at 34, used to provide power as necessary to the various circuitry on the trunk side of the network.

The CANH and CANL lines feed signals to and from a transceiver 36 which is also connected to a repeater 38, preferably an interlocking repeater circuit such as that shown at 20 in FIG. 1. A fault isolation or lock out circuit 40, such as those indicated at 26 and 28 in FIG. 2, is preferably positioned in the path which transmits signals from the branch side of the network to the trunk side. Repeater 38 and isolator 40 are each connected to an opto-coupler 42 which provides electrical isolation between the trunk side and branch side in the event of transient voltages. Although indicated as a single opto-coupler block in FIG. 3, in the present exemplary implementation, a pair of opto-couplers are actually used, one in the receive path and one in the transmit line. Opto-coupler 42 is also electrically connected to a second transceiver 46 which provides a signal receipt and transmission interface to the branch cable. Power from a voltage regulator 44, is applied to opto-coupler 42 and transceiver 46.

An alternate exemplary implementation of a connector including the repeater circuit of the present invention is shown in FIG. 4. This implementation is generally similar to that shown in FIG. 3, with the exception of opto-coupler 42. In addition, the V+ and V− lines of trunk line 30 are connected to the corresponding power lines on the branch side with the connections on the V+ line running through a recoverable fuse indicated at PTC. This recoverable fuse goes to a high impedance state in the presence of a short circuit to provide current limiting.

While these connector implementations generally illustrate the isolating repeater of the present invention in a tee connector which prevents faulty signals coming from a branch from being transmitted onto the trunk, isolation can alternately or additionally occur in the other direction as well. Also, by connecting transceiver 36 to an additional segment of branch cable rather than to the main trunk, an in-line connector may be produced for use as a conventional in-line repeater.

The circuit of the present invention thus provides an interlocking repeater having the ability to identify and isolate faulty line segments in a CAN-based communication network. A visual indication of the existence of such a fault is also provided by an LED subcircuit. This allows the faulty segment to be repaired while the remainder of the network is allowed to operate normally. Implementation within a tee or in-line connector provides a convenient and cost effective means for performing this fault isolation function. Propagation delay is minimized by allowing signal transmission which bypasses most of the isolation circuitry absent the occurrence of a signal fault.

For the sake of clarity, the various values of the electronic components have been omitted from the figures but are shown in the chart below for completeness.

| ITEM | VALUE |
| --- | --- |
| R0 | 5k |
| R1 | 110k |
| R2 | 10k |
| R3 | 110k |
| R4 | 10k |
| R5 | 1.6k |
| R6 | 1.6k |
| C0 | 27pf |
| C1 | 1000pf |
| C2 | 1000pf |
| LED1,2 | |

-continued

| ITEM | VALUE |
| --- | --- |
| U2 | MC74HC4538 |
| U3 | MC14013 |
| U4 | MC74HC32 |
| U5 | MC74HC04 |
| U6 | 74HC08 |
| U7 | MC74HC32 |
| XCVR (36)(46) | 82C251 |
| Opto-Coupler (42) | HCPL-0710 |
| D1 | IN4148 |

The foregoing discloses and describes merely an exemplary embodiment of the present invention. One having skill in the art will readily recognize that various changes and modifications can be made thereto without departure from the spirit and scope of the present invention as set forth in the following claims.

What is claimed is:

1. An isolation circuit for selectively enabling and disabling the transmission of an input signal in a communication network comprising:

input means for receiving said input signal;

timer means adapted to start timing with each transition in said input signal from a first logic level to a second logic level;

pulse generating means responsive to said input signal and said timer for producing a designated output signal when a said transition in said input signal does not occur within a predetermined time period; and signal transmission enabling means responsive to said input signal and said designated output signal for enabling the transmission of said input signal when said input signal is at said first logic level or when said input signal is at said second logic level, but only in the absence of said designated output signal.

2. The circuit of claim 1 further comprising fault indicating means for producing an indication of said enabling or disabling of said input signal transmission.

3. The circuit of claim 2 wherein said fault indicating means includes a light emitting diode.

4. The circuit of claim 1 wherein said input means, timer means and pulse generating means are provided by a retriggerable one-shot.

5. The circuit of claim 4 wherein said signal transmission enabling means includes a resettable flip-flop.

6. The circuit of claim 5 wherein said signal transmission enabling means further includes a logic gate.

7. The circuit of claim 1 wherein said communication network includes a repeater and said enabling means selectively enables the transmission of said input signal to an input of said repeater.

8. The circuit of claim 7 wherein said repeater facilitates bi-directional signal transmission and wherein said network includes a second isolation circuit connected to a second input of said repeater.

9. The circuit of claim 1 wherein said network operates in accordance with a CAN protocol and said second logic level is a low logic level.

10. An isolation circuit for selectively enabling and disabling the transmission of an input signal in a communication network comprising:

a retriggerable one-shot adapted to receive said input signal and start timing with each transition in said input signal from a first logic level to a second logic level, said one-shot producing a designated output signal in the absence of a said transition in said input signal within a predefined time period;

a flip-flop responsive to said one-shot output signal for producing an enabling output signal in response to the absence of a said designated one-shot output signal or in the presence of said designated one-shot output signal when occurring in combination with an input signal at said first logic level; and a logic gate for allowing the transmission of said input signal only in the presence of a said flip-flop enabling output signal.

11. The circuit of claim 10 wherein said input signal is input into the reset terminal of said flip-flop.

12. The circuit of claim 10 wherein said logic gate has a gate input, said input signal and said flip-flop output signal.

13. The circuit of claim 12 wherein said network further comprises a repeater and said gate output is coupled to an input to said repeater.

14. The circuit of claim 10 wherein said network includes at least one branch line connected to a main bus line and said isolation circuit selectively enables the transmission of an input signal originating on said branch line from being transmitted onto said main bus line.

15. A method for controlling the transmission of an input signal in a communications network so as to prevent the transmission of a fault-indicating input signal, said method comprising the steps of:

receiving said input signal;

starting a timer with each transition in said input signal from a first logic level to a second logic level;

producing a designated output signal if a second said logic level transition in said input signal does not occur within a predetermined period of time; and allowing the transmission of said input signal via said network only in the absence of a said designated output signal and thereafter only if said input signal is at a logic level other than said second logic level.

16. The method of claim 15 further comprising the step of providing a visual indication of the prevention of input signal transmission.

17. The method of claim 15 wherein said network operates in accordance with a CAN protocal, said second logic level is a LOW logic level and said predetermined time period is an amount equivalent to 13 bit times.

18. The method of claim 15 wherein said allowed transmission of said input signal is to a repeater.

19. The method of claim 18 wherein said repeater includes two inputs and said method is applied to control transmission of signal to both said inputs.

20. The method of claim 15 wherein said communication system includes a plurality of segments branching from a main bus line and wherein said method controls the transmission of signals generated by devices on said branches onto said bus line.

21. A connector for electrically coupling a branch transmission line to a main bus line in a communication network, said connector comprising:

a first transceiver electrically coupled to said bus line for receiving signals from said bus line and transmitting signals onto said bus;

a repeater electrically coupled to said first transceiver;

a fault isolation circuit electrically coupled to said repeater so as to be capable of preventing the transmission of fault-indicating signals to said repeater for subsequent transmission by said first transceiver onto said bus line, said isolation circuit including:

input means for receiving said input signal;

timer means for counting the time between successive transitions in said input signal from a first logic level to a second logic level;

signal generator means for producing a designated output signal in the absence of two said transitions in said input signal within a predetermined time period; and gating means for enabling the transmission of said input signal when said input signal is at said first logic level or when at said second logic level but only in the absence of said designated output signal; and a second transceiver electrically coupled to said branch transmission line, said second transceiver adapted to receive signals from said branch line for transmission as an input signal to said fault isolation circuit and for receiving signals output by said repeater for transmission onto said branch line.

22. The connector of claim 21 further comprising an electrical isolation means electrically coupled between said second transceiver and said fault isolation circuit or said repeater.

23. The connector of claim 22 wherein said electrical isolation means includes an opto-coupler.

24. The connector of claim 23 wherein said branch transmission line has an external electrical power source coupled thereto and said connector includes a voltage regulator for powering said opto-coupler.

25. The connector of claim 21 wherein said main bus line includes a power supply line and a ground line and wherein said connector further includes a voltage regulator electrically coupled to said power and ground lines of said main bus line.

26. The connector of claim 25 further including means for electrically connecting said power and ground lines of said main bus to power and ground lines in said branch transmission line.

27. The connector of claim 26 wherein said connector further comprises a recoverable fuse.

28. An isolation circuit for selectively disabling the transmission of an input signal in a communication network, the circuit comprising:

a signal transmission disabling circuit coupled to the input signal and including a timer adapted to start timing upon a transition in the input signal from a first logic level to a second logic level, said disabling circuit generating a disable output signal if the input signal remains at said second logic level for a predetermined period of time; and a gating circuit coupled to the input signal and said disabling circuit, said gating circuit responsive to said disable output signal for preventing transmission of the input signal.

29. The circuit as defined in claim 28 wherein said signal transmission disabling circuit includes a retriggerable one-shot and a resettable flip-flop.

30. The circuit as defined in claim 28 wherein said gating circuit includes a logic gate.

31. A method for controlling the transmission of an input signal in a communications network, the method comprising the steps of:

receiving the input signal;

starting a timer upon a transition in the input signal from a first logic level to a second logic level;

generating a disable output signal if the input signal remains at said second logic level for a predetermined period of time;

preventing the transmission of the input signal if said disable output signal is generated.

\* \* \* \* \*